May 7, 1940.  F. G. HUGHES  2,199,997
BRAKE
Filed Feb. 11, 1938  2 Sheets-Sheet 1
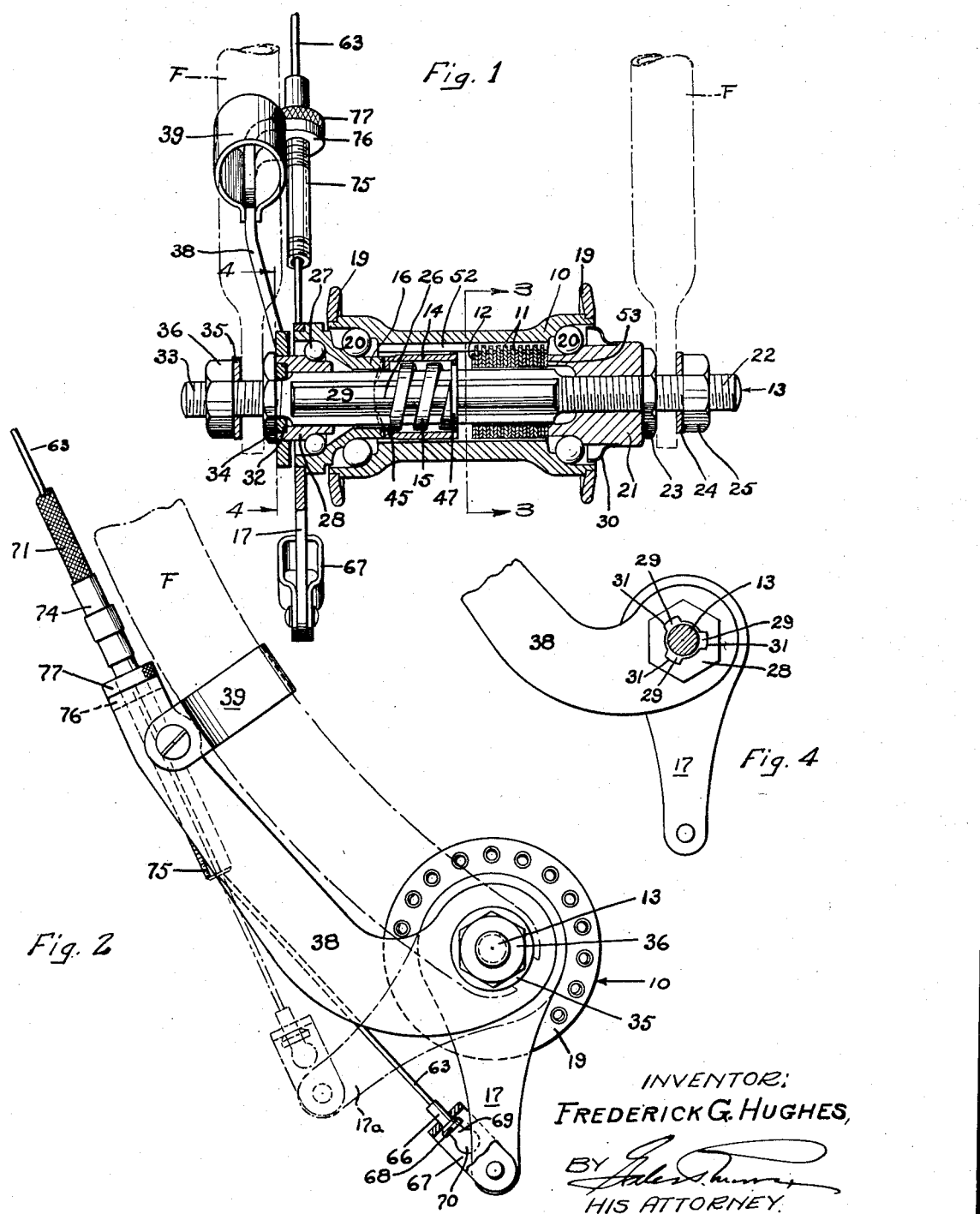
INVENTOR:
FREDERICK G. HUGHES,
BY
HIS ATTORNEY.

May 7, 1940.  F. G. HUGHES  2,199,997
BRAKE
Filed Feb. 11, 1938  2 Sheets-Sheet 2
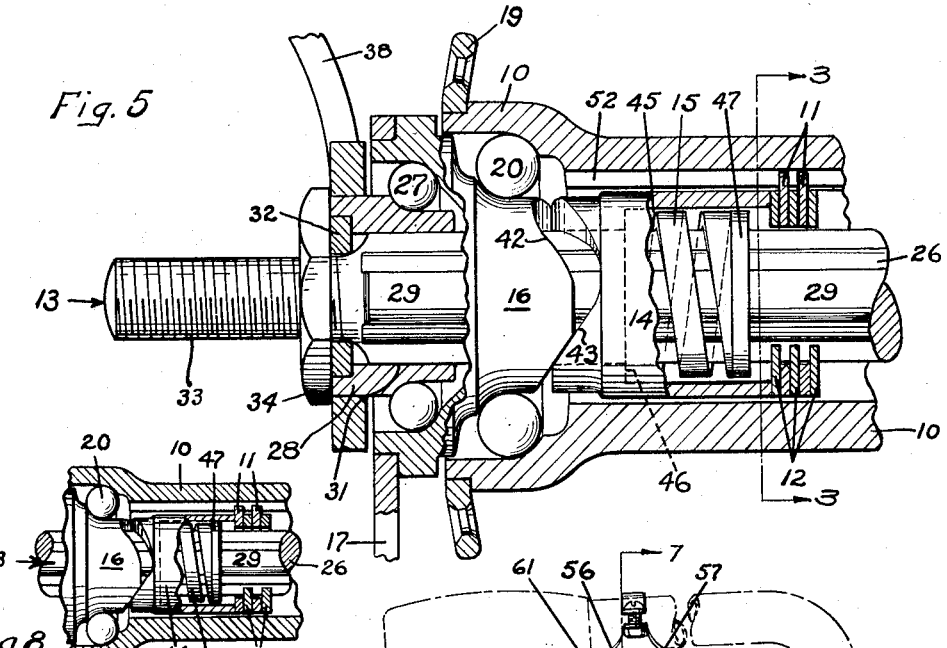
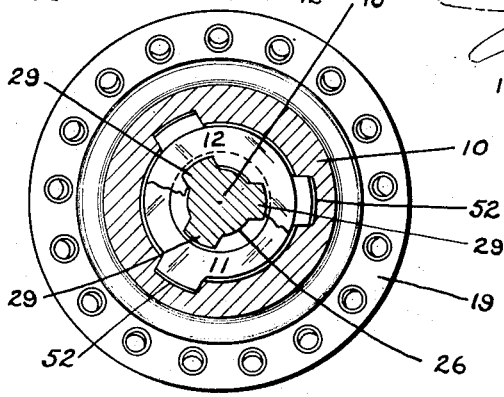
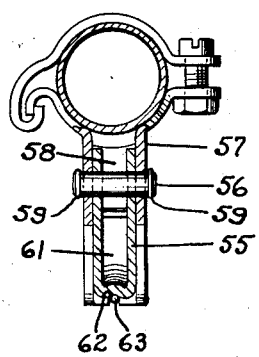
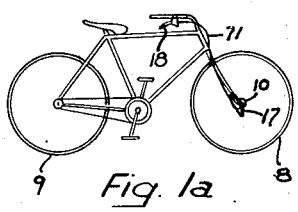
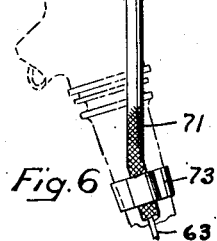
INVENTOR;
FREDERICK G. HUGHES,
BY
HIS ATTORNEY.

Patented May 7, 1940

2,199,997

UNITED STATES PATENT OFFICE 2,199,997

BRAKE

Frederick G. Hughes, Bristol, Conn., assignor to General Motors Corporation, Detroit, Mich., a corporation of Delaware Application February 11, 1938, Serial No. 189,979

13 Claims. (Cl. 188—26)

My invention relates to braking mechanisms, and is particularly applicable to front wheels of bicycles and the like for supplementing the braking action now commonly applied to the propelling or driving wheel, as, for example, when a slight braking is desired during coasting, or when a braking action additional to that applied at the driving wheel is required for a quick, emergency stop in heavy traffic.

One object is to provide a housed braking mechanism for front wheels, so that there are no exposed parts that can so deteriorate from weather, dirt, and the like, as to cause faulty operation that can interfere with steering during brake application.

Further objects are to provide for easy manual control, gradual and positively controlled deceleration, unit-handling, and readily assembling into wheels and frames of standard manufacture.

To these ends, and also to improve generally upon devices of the character indicated, the invention consists in the various matters hereinafter described and claimed.

In the accompanying drawings,

Figure 1 is a longitudinal diametrical view, chiefly in section, through my brake mechanism, showing the brake parts in released positions;

Figure 1a is a diagrammatic showing of a bicycle having my braking mechanism associated with the front wheel;

Figure 2 is an end view of the device;

Figure 3 is an enlarged cross section taken substantially along the line 3—3 of Figures 1 and 5, looking in the direction of the arrows;

Figure 4 is a view taken substantially on the line 4—4 of Figure 1, and looking in the direction of the arrows;

Figure 5 is an enlarged fragmentary view generally similar to the left end of Figure 1, but showing the parts in brake operating positions;

Figure 6 illustrates the manual control mechanism for operating the brake;

Figure 7 is an enlarged cross section taken substantially along the line 7—7 of Figure 6, and looking in the direction of the arrows; and Figure 8 shows a modified brake structure.

Generally stated, in the illustrated embodiments of my invention, cooperating clutch members, such as the brake discs 11 and 12, are slidably but non-rotatably and respectively mounted upon the hub 10 and the axle shaft 13 of the propelled or front wheel 8 of a bicycle having a propelling wheel 9, and although normally free from lateral frictional clutching or braking engagement, so that the hub is freely rotatable, these discs can, when desired, be laterally urged into braking engagement by the bicycle rider's manual rotation of the brake actuator 16 by means of a hand lever 18, and which thereby forces a correspondingly cammed but non-rotatable brake applicator 14 against the brake discs, the spring 15 returning the parts to brake-releasing positions when the operator releases his grasp on the hand lever.

More specifically, in the embodiment shown in Figures 1 to 7, an axle 13 having an intermediate enlarged body portion 26 provided with longitudinally extending splines 29, is provided near its ends with cones 21 and 28, while a tubular camming cone or brake actuator 16 is rotatably supported on the cone 28 by the ball bearing 27, that brake actuator and the cone 21 rotatably supporting the wheel hub 10 with its spoke flanges 19, upon the ball bearings 20. Preferably lock nuts 23 and 34, respectively threaded on the reduced axle ends 22 and 33, secure the intermediate parts in adjusted position upon the axle which may be secured in a standard front bicycle fork F in the usual way by means of the customary washers 24 and 35 and the customary nuts 25 and 26 upon the threaded axle ends. The cone 21 is adjustably threaded upon the axle end 22 and preferably carries a stamped metal dust guard 30.

The cone 28 has keyways 31 for slidably receiving the axle splines 29 and is non-rotatably connected to an anchoring-arm 38, as by having a non-cylindrical end portion, such as a hexagonal end, socketed in a similar non-cylindrical opening in the anchoring-arm, which latter is secured by a strap 39 to one of the arms of fork F, thus holding the axle 13 from rotation. If desired, the cone 28 can be brazed to the anchoring-arm 38, and an abutment washer 32 is brazed to this cone in an outwardly-opening counterbore for abutting engagement against the adjacent end of the enlarged body portion 26 of the axle, so that inward movement of the cone 28 is prevented, the lock nut 34 securing the cone 28 against outward movement.

An operating arm 17 is brazed to the outer end of the brake actuator 16 provided at its inner end with an annular cam face 42 engaging a similar cam face 43 on the outer end of the brake applicator 14 which is slidably keyed to the splines 29 in generally the same manner as is the cone 28. The coiled spring 15, which is housed within a counterbore 45 in the applicator 14, is compressed between a shoulder 46 at the end of the counterbore and a guide collar 47, brazed to the axle and slidably received in the counterbore, to urge the cam faces 43 and 42 into mating relation for positioning the parts in their respectively non-operative positions shown in full lines in Figures 1, 2 and 6. The cam faces 42 and 43 are of such contours that the spring 15 may urge them into mating relation whenever the manual control of arm 17 is released.

My braking mechanism includes a plurality of the adjacent rotatable and non-rotatable brake discs 11 and 12 alternately keyed for individually axially slidable movements in the hub keyways 52 and on the axle splines 29. When the brake applicator 14 is shifted away from the brake discs by the spring 15 to the inoperative position of Figure 1, the discs move laterally and individually out of frictional braking engagement, and the hub 10 is free to rotate. When the rider pulls the hand lever 18 to the position 18a to shift the actuator arm 17 to the position 17a, the brake applicator 14 is cammed into brake disc engagement and these discs 11 and 12 are tightly clamped together into frictional braking engagement between the applicator 14 and a shoulder 53 on the cone 21, thus causing a smooth easily regulated braking operation under direct control of the extent of movement of the hand lever 18.

To avoid concentration of torsional stresses which would tend to cause breakage of the mechanism if the brake were applied suddenly under excessive pressure, the series of braking discs 11 and 12 are preferably located near that end of the hub 10 that is as far away as practicable from that portion of the axle which is held substantially immovable by the fixed cone 28. This construction takes advantage of the slightly resilient characteristic of the axle against twisting and provides for an absorption of torsional stresses throughout a considerable axle length.

The hand lever 18, which is formed from sheet metal bent to provide a suitable hand grip and having a substantially U-shaped cross section, is pivotally supported by a pin 56 extending through the side walls of a sheet metal bracket 57 clamped to the handle bar in such a position that the rider may easily extend his fingers from beneath the handle bar and move the hand lever to the braking position 18a without removing his hand from a guiding position on the handle bar. The pin 56 is peripherally grooved near its ends and held in position by snap rings 59. A struck-up portion 60, on the bracket front wall 58, is located in the path of movement of an arcuate sector portion 61 of the lever and preferably beneath and concentric with the pin 56, to locate the inoperative position of the lever 18, as shown in full lines in Figure 6, and the under side of this sector is grooved at 62 to receive and guide the upper end of a flexible control cable 63 protected through the greater part of its length by a flexible covered conduit 71. The rearward end of the arcuate sector 61, forms a stepped portion with the hand grip portion of the lever 18 to provide a shoulder 64, and the cable end, which passes through a hole in this shoulder has a lug 65 soldered thereon and engaging the shoulder, so that a braking movement of the lever 18 will pull the cable through the conduit.

The lower end of the cable 63 has soldered thereon a lug 66 socketed in a yoke member 67 pivoted to the outer extended end of arm 17. To facilitate demountably securing the lug 66 in position, a head 68 on the lower end of the lug is arranged to be inserted through the enlarged end 70 of a slot 69 through one of the side walls of the yoke and extending into and through the end yoke wall. After the head 68 has been inserted through the opening 70, the body portion of the lug may be easily slid through the narrow portion of the slot 69, so that the head is located beneath the end wall as shown. The conduit, which may be secured to the bicycle frame at convenient positions by clips 73, has ferrules 74 at its ends respectively received through the bracket wall 58 and in the upper end of an adjustment sleeve 75 that is slabbed off on one side and slidable and non-rotatably received in a mating hole through a laterally projecting ear 76 on the anchor arm 38 and supported in position by a thumb nut 77. By turning the thumb nut and adjustably locating the lower end of the sleeve relative to the released positions of the actuator arm 17, the effective length of the control cable 63 may be easily regulated to locate the range of brake operating movement for the hand lever 18 and also to provide a suitable take-up on the controls to compensate for brake wear.

In the modification of Figure 8, all parts except the brake discs are as previously described, but these discs are assembled with a rotatable driven disc 11 engageable with the brake applicator 14.

I claim:

1. In a device of the character indicated, an axle, a hub rotatable about the axle, brake members respectively interlocked with the axle and with the hub for relative movements into and out of braking engagement with each other, an anchoring arm interlocked with a portion of the axle and holding the axle from rotation remote from the brake members and brake operating means between the anchoring arm and said brake members, whereby the torsional stresses of braking will be distributed and absorbed in the axle; substantially as described.

2. In a device of the character indicated, a rotatable member, an axle therefor, a brake mechanism therefor, an applicator for operating said mechanism; and yieldable means surrounding the axle and housed within the applicator for urging the applicator out of operative position; substantially as described.

3. In a device of the character indicated, a shaft and a surrounding member having relative rotation, a brake mechanism engageable with the shaft and said member, a sleeve member axially movable to operate the brake mechanism, and a spring housed in said sleeve for shifting the sleeve out of brake operating position; substantially as described.

4. In a device of the character indicated, a shaft and a surrounding member having relative rotation, a brake mechanism between the shaft and said member, a sleeve movable to operate the brake mechanism, an abutment on the shaft, and a spring housed in the sleeve and engageable with the abutment and said sleeve to shift the sleeve out of brake operating position; substantially as described.

5. In a device of the character indicated, a rotatable hub, an axle therefor, a brake mechanism between the hub and the axle, a brake applicator movably supported on the axle for operating said mechanism, and spring means on the axle and housed by the applicator for shifting said applicator out of brake operating position; substantially as described.

6. In a device of the character indicated, a rotatable hub, an axle therefor, brake mechanism for the hub, a non-rotatable brake applicator slidable on the axle for controlling the brake mechanism, an actuator rotatable on the axle, the applicator and actuator having similar abutting cam faces, and a spring housed in the applicator for urging the cam faces into interfitting relation to locate the applicator and the actuator in non-braking positions; substantially as described.

7. In a device of the character indicated, a rotatable hub, a non-rotatable axle therefor, an applicator member slidably and non-rotatably mounted on the axle for operating the brake mechanism, and actuator member rotatable on the axle, said members having abutting cam faces which matingly engage when the brake is released, an abutment on the axle, and a spring on the axle and housed in the applicator and compressed between the abutment and the applicator for urging the cam faces into mating engagement; substantially as described.

8. In a device of the character indicated, a brake mechanism, an anchoring member therefor, a brake operating arm journalled on said member, a control lever, a flexible cable operatively connecting the lever and said arm, and a guide receiving the cable and adjustably secured to the anchor member for regulating the effective cable length; substantially as described.

9. In a device of the character indicated, a brake mechanism, an anchoring member therefor, a brake operating arm rotatably supported on said member, a control lever, a flexible cable operatively connecting said lever to said arm, a guiding sleeve for the cable adjustably mounted on the anchoring member to regulate the effective cable length, and means to secure the sleeve in adjusted position; substantially as described.

10. In a device of the character indicated, a rotatable hub, a non-rotatable axle therein, a brake mechanism between said hub and axle and movable into and out of a braking position, a brake operating element movable on the axle to and from a braking position, an applicator mounted on the axle and movable in response to said element for shifting the brake to a braking position, and means enclosed within the applicator for normally shifting said applicator and said element to non-braking position; substantially as described.

11. In a device of the character indicated, a rotatable hub, a non-rotatable axle extending therethrough, braking members respectively keyed to the hub and to said axle and relatively slidable into and out of a braking position, a manually controlled brake operating element rotatably supported on the axle for movement to and from a braking position, an applicator slidably keyed to the axle and responsive to said operating element for shifting the braking members to braking position, and yieldable means enclosed within the applicator which shifts the brake operating element and the applicator to non-braking position whenever the manual control of said element is released; substantially as described.

12. In a device of the character indicated, a rotatable hub, a non-rotatable axle having a splined portion within said hub, braking discs respectively keyed to the hub and to said splined portion for relative slidable movement into and out of braking engagement, a brake operating element rotatably journalled on the axle for movement into and out of a braking position, an applicator sleeve slidably keyed on said splined portion and responsive to said element for shifting the discs to said braking position, and resilient means between the axle and said sleeve which urges the sleeve and said element to non-braking positions; substantially as described.

13. In a device of the character indicated, a rotatable hub, an axle extending therethrough, an anchoring arm non-rotatably socketed on the axle at one end of the hub to prevent axle rotation, and brake discs respectively carried by and slidably interlocked with the axle and the hub at the other end of said hub for movement into and out of braking engagement, whereby the torsional stresses of braking will be yieldably absorbed throughout the major length of the axle and the dangers of axle breakage will be minimized; substantially as described.

FREDERICK G. HUGHES,